(12) United States Patent
Han et al.

(10) Patent No.: US 11,604,260 B2
(45) Date of Patent: Mar. 14, 2023

(54) LIDAR DEVICE WITH POLYGON-SHAPE MIRROR AND PRISM FOR AUTONOMOUS DRIVING VEHICLES

(71) Applicant: Baidu USA LLC, Sunnyvale, CA (US)

(72) Inventors: Yang Han, Sunnyvale, CA (US); Yaoming Shen, Sunnyvale, CA (US); Xiangfei Zhou, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 933 days.

(21) Appl. No.: 16/195,637

(22) Filed: Nov. 19, 2018

(65) Prior Publication Data

US 2020/0158829 A1 May 21, 2020

(51) Int. Cl.
*G01S 7/481* (2006.01)
*G01S 7/484* (2006.01)
*G01S 17/42* (2006.01)
*G01S 17/931* (2020.01)

(52) U.S. Cl.
CPC ............ *G01S 7/4817* (2013.01); *G01S 7/484* (2013.01); *G01S 17/42* (2013.01); *G01S 17/931* (2020.01)

(58) Field of Classification Search
CPC ............ G01B 2210/306; G01S 7/4817; G01S 7/484; G01S 17/931; G01S 17/42; G02B 2006/12114; G02B 5/045; G02B 6/3528; H01S 3/123; H01S 3/125; H01S 3/0811; H01S 3/0823; H01Q 15/02
See application file for complete search history.

(56) References Cited

U.S. PATENT DOCUMENTS

| 2004/0212863 A1* | 10/2004 | Schanz | G02B 26/108 359/211.2 |
| 2006/0244978 A1* | 11/2006 | Yamada | G01S 17/931 356/614 |
| 2019/0107623 A1* | 4/2019 | Campbell | G01S 7/4802 |

FOREIGN PATENT DOCUMENTS

| JP | H07113981 A | * | 5/1995 | |
| WO | WO-2016101973 A1 | * | 6/2016 | G01S 17/10 |

* cited by examiner

*Primary Examiner* — Luke D Ratcliffe
(74) *Attorney, Agent, or Firm* — Womble Bond Dickinson (US) LLP (57) ABSTRACT

A two dimensional (2D) LIDAR scanning system that uses a combination of a rotating polygonal mirror and a rotatable prism to scan an area of an object. The polygonal mirror and prism are rotated in combination to generate a scanning pattern. A pulsed laser is directed to the polygonal mirror and the prism is held in a fixed position. The polygonal mirror is then incremented a plurality of times to generate a scan line of LIDAR data. The prism is then incremented and a next scan line, e.g., up or down from the first scan line, is generated. An avalanche photodiode (APD) can read the reflections of objects for each scan point. Object reflections can be directed to the APD using either a polarizing beam splitter with a quarter wave plate, or a 50-50 beam splitter.

20 Claims, 9 Drawing Sheets

LIDAR DEVICE WITH POLYGON-SHAPE MIRROR AND PRISM FOR AUTONOMOUS DRIVING VEHICLES

TECHNICAL FIELD

Embodiments of the present disclosure relate generally to LIDAR sensors for use with an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

One of the onboard sensors in an autonomous driving vehicle (ADV) is a light detection and ranging ("LIDAR"). LIDAR can be used by an ADV to detect objects surrounding the ADV while driving. LIDAR can also be used to generate and/or update a high-definition map representing objects surrounding the ADV, such as buildings, roadways, signs, trees, and other objects that may appear in a high definition map.

For onboard LIDAR to be effective in detecting objects surrounding the ADV, the scanning for objects must be performed quickly and capture as much information surrounding the ADV as possible.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments described herein implement a LIDAR device having a two-dimensional scanning system that includes a polygonal-shaped mirror rotated in a first plane and a prism rotated in a second plane to scan in two dimensions. A single optic path is implemented for both emitting laser beams for scanning, and for receiving reflected laser beams off of a target object. In one embodiment, a laser beam is emitted and passed through a collimating lens, then through a 50% reflective-50% transmissive optic. Thus, 50% of the emitted beam is collimated and transmitted to the target object. A reflected beam, off of the target object, returns to the 50% reflective-50% transmissive optic and is reflected toward an optical sensor for processing. In another embodiment, a laser beam is emitted and passed through a collimating lens, then through a polarization optic and a polarization rotation optic and transmitted to the target object. A reflected laser beam, off of the target object, returns to the rotation polarization object which further rotates the reflected beam, which is then reflected by the polarizing optic, toward the optic sensor for processing. Further embodiments are described below.

In a first embodiment, a computing-implemented method of scanning a target object includes emitting, by a laser emitter, an initial laser beam and a plurality of additional laser beams to scan a target object. The method further includes positioning a polygonal mirror to receive the laser beam from the laser emitter. The polygonal mirror can have a plurality of reflective surfaces and can be configured to rotate in a first rotational direction to reflect the laser beams into a first set of plurality of laser beams in a first plurality of directions. The first plurality of directions can be a scanning first plane. The method can further include positioning a prism to receive at least a portion of the first set of laser beams. The prism can be configured to divert the first set of laser beams into a second set of plurality of laser beams in a second plurality of directions in a second plane, so that the second set of laser beams scan a target object in a wider angle. An optical sensor can be configured to receive a third set of laser beams reflected from the target object. In an embodiment, a synchronizing module can synchronize the emitting of laser beams and positioning of the polygonal mirror and prism to scan the target object. In an embodiment, the method can include positioning the polygonal mirror once for all laser beams in the first set of laser beams and positioning the prism for each laser beam in the first set of laser beams. In another embodiment, the method can include positioning the polygonal mirror for each laser beam of the first set of laser beams and positioning the prism once for all laser beams in the first set of laser beams. In an embodiment, synchronizing the laser emitter, polygonal mirror, and prism can include one of continuously emitting laser beams, without reading the optical sensor for those laser beams that occur during the positioning of the polygonal mirror and/or prism; or, stopping the emitting of laser beams during times that either, or both, of the polygonal mirror and/or the prism are being positioned.

In a second embodiment, a non-transitory computer-readable medium can store executable instructions that, when executed by a processing system having at least one hardware processor, cause the processing system to perform any of the method operations described above.

In a third embodiment, any of the above method operations can be performed on a system that includes a memory programmed with executable instructions, the memory coupled to a processing system having at least one hardware processor, the method operations carried out when the instructions are executed by the processing system. A non-transitory computer-readable medium can store executable instructions that, when executed by a processing system having at least one hardware processor, perform any of the above method operations.

In a fourth embodiment, a LIDAR device for use in an autonomous driving vehicle (ADV) can include a laser emitter, a polygonal mirror, a prism, and an optical sensor to receive laser beams reflected from a target object. The laser emitter can emit an initial laser beam and subsequent laser beams. The polygonal mirror can have a plurality of reflective surfaces, and can be positioned to receive a laser beam from the laser emitter. The polygonal mirror can be configured to rotate in a first direction to deflect the initial laser beam and subsequent laser beams into a first set of a plurality of laser beams in a first plurality of directions in a first plane, using the reflective surfaces. The prism can be positioned to receive at least a portion of the first set of laser beams. The prism can be configured to divert the first set of laser beams into a second set of a plurality of laser beams in a second plurality of directions in a second plane. The second set of laser beams can scan a target object in a wider angle. In an embodiment, the prism can be configured to rotate in a second rotational direction to deflect the first set of laser beams in a wider scanning angle. In an embodiment, the first rotational direction is different than the second rotational direction. In an embodiment, the first plane and the second plane can be substantially perpendicular, such that the third set of beams represent a substantially rectangular scan area of the target object. The LIDAR device can be configured such that the polygonal mirror is positioned once for all laser beams in the first set of laser beams and the prism can be positioned for each laser beam in the first set of laser beams. In an another embodiment, the polygonal mirror can be positioned for each laser beam of the first set of laser beams and can position the prism once for all beams in the first set of laser beams. The LIDAR device optical path can further include a filtering optic, such as a 50% transmissive-50% reflective optic such that 50% of an emitted laser beam is transmitted to the target object, and a reflection of the laser beam off of the target object can be reflected to an optical sensor by the filtering optic. In another embodiment, the filtering optic can be a polarization optic, and an additional polarization rotation optic can be included after the polarization optic. A reflection off of the target object is received by the polarization rotation object, and the polarization of the reflected laser beam is rotated again before being reflected to the optical sensor. In an embodiment, the laser emitter can emit laser beams having at least one of a wavelength of 905 nm or 1550 nm laser pulse, or a pulse rate of 220 KHz, 1 MHz, or 3 Mhz. The LIDAR device can further comprise a processing system, having at least one hardware processor, that includes a synchronization module. The synchronization module can coordinate emitting of laser beams and positioning of the polygonal mirror and prism to scan the target object. Synchronization can include continuously emitting laser beams, without reading the optical sensor for those laser beams that occur during the repositioning of the polygonal mirror and/or prism. In an embodiment, synchronization can include stopping the emitting of laser beams during times that either, or both, of the polygonal mirror and/or the prism are being positioned.

Figure 1:
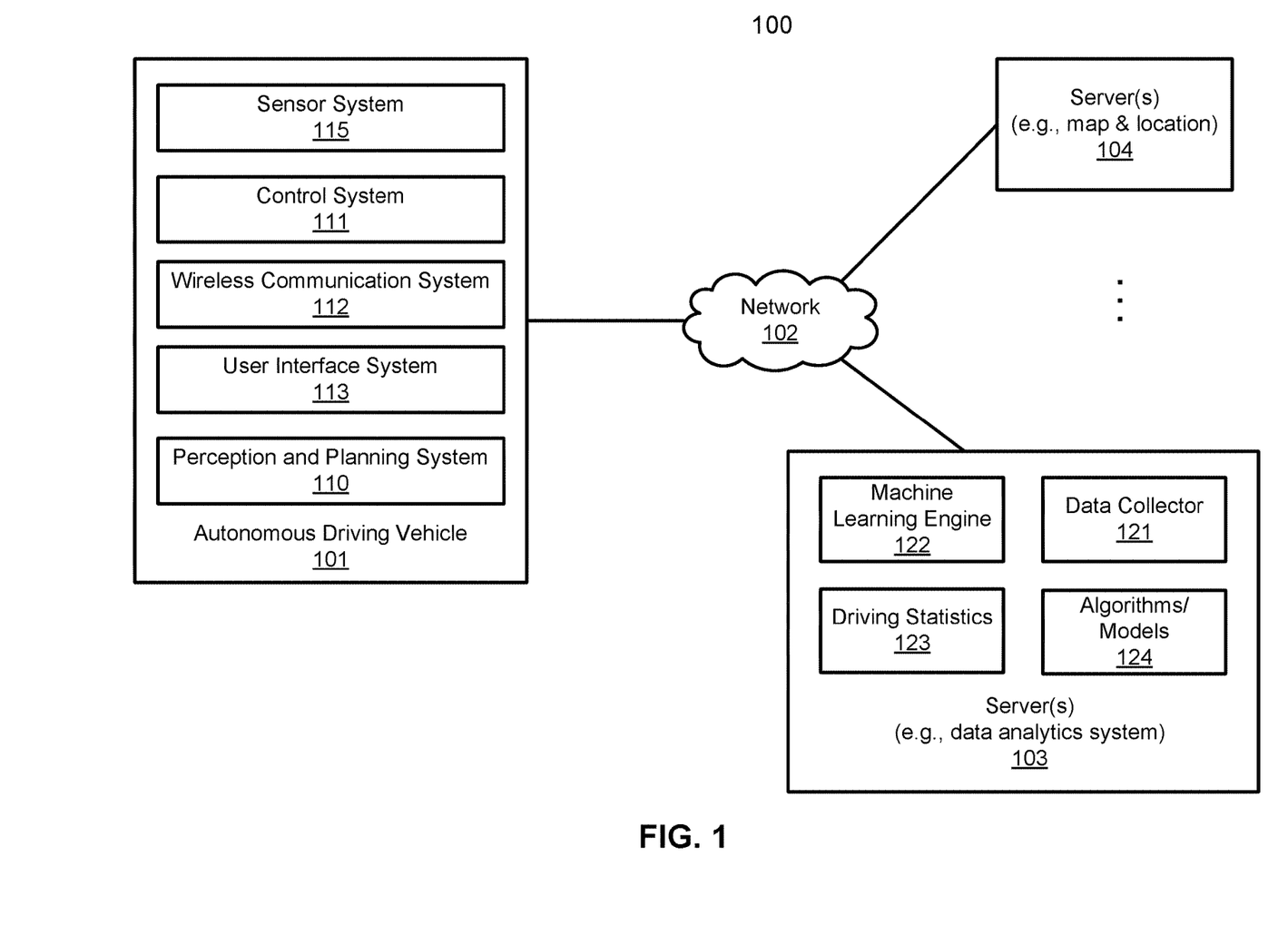
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of network such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous driving vehicle (ADV) 101 refers to a vehicle that can be configured to operate in an autonomous mode in which the vehicle navigates through an environment with little or no input from a driver. Such an autonomous driving vehicle can include a sensor system 115 having one or more sensors that are configured to detect information about the environment in which the ADV 101 operates. The ADV 101 and its associated controller(s) use the detected information to navigate through the environment. Autonomous driving vehicle 101 can operate in a manual mode, a full autonomous mode, or a partial autonomous mode. In a manual mode, the ADV 101 can be operated by a human driver with little, or no, assistance for logic onboard the autonomous vehicle. In full autonomous mode, the ADV 101 can be operated using little, or no, human driver assistance. In partial autonomous mode, ADV 101 can be operated with some or all driving logic subsystems active, and a human driver providing some driving control inputs.

In one embodiment, autonomous driving vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
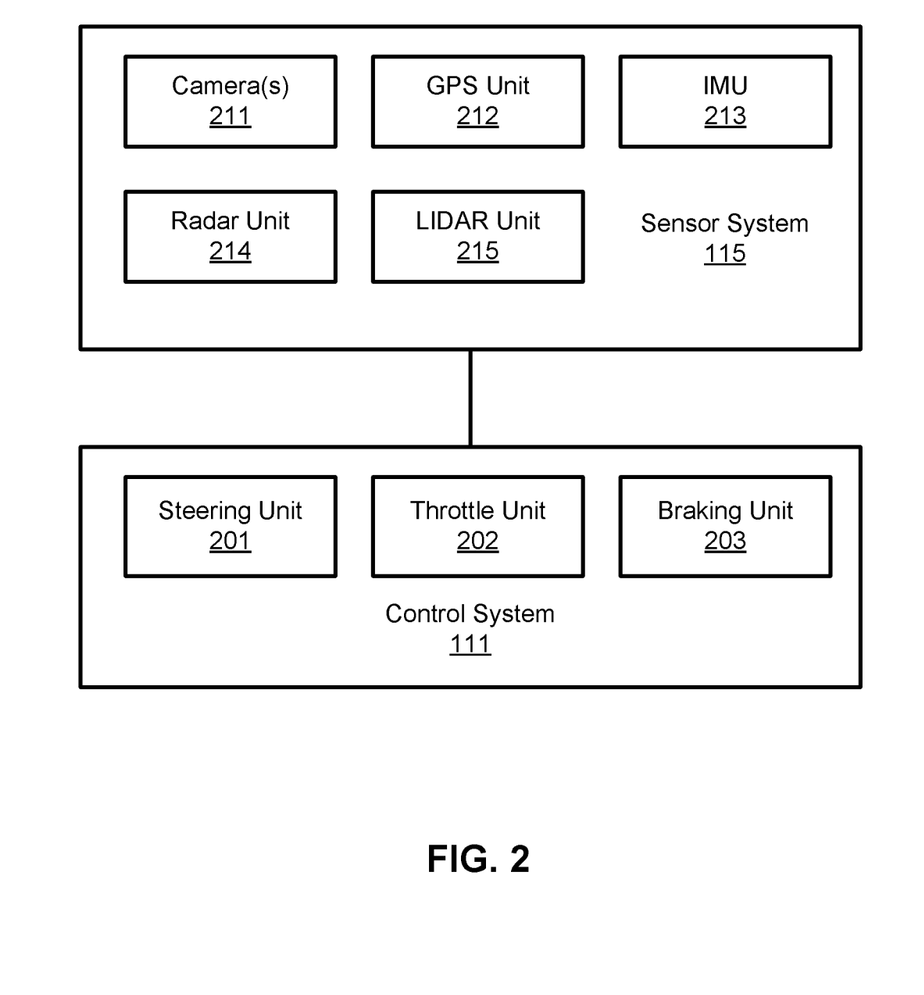
FIG. 2 is a block diagram illustrating an example of an autonomous driving vehicle (ADV) according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. LIDAR unit 215 can include a laser emitter, a rotating polygonal mirror and a rotatable prism that can be synchronized to perform a two-dimensional scan of a target object. The LIDAR unit optical path can include optical configurations that enable a reflection of an emitted laser beam to return to an optical sensor along a path that includes the polygonal mirror and prism. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

Sensor system 115 can detect obstacles to a path of an ADV. Such obstacles can be taken into account by a least cost path module that emulates human driving behavior.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof. Steering unit 201 can be controlled, at least in part, by a least cost path module that participates in determining a path for navigating the ADV along a route.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Data collector 121 may further receive LIDAR information from a LIDAR device in the sensor system 115 of the autonomous vehicle control system. LIDAR information may be transmitted to server 103 to update a high-definition (HD) map of objects surrounding the autonomous vehicle.

In an embodiment, data collector 121 can record data comprising driving statistics 123 for an initial path for a portion of an ADV route, and a selected least cost path for the portion of the route. And initial path can be, for example, a path that follows a centerline of a lane of roadway. Driving statistics 123 can also include sensor data and control input data associated with the ADV while it drives along a path along the route. Driving statistics 123 for a path can include speed, heading, steering input, braking input, if any, and sensor data including lateral forces, acceleration, and braking forces, and the like, such as may affect passenger comfort as the ADV drives along a path. Machine learning engine 122 can use driving statistics 123 to generate algorithms and models 124 that can be used to upgrade ADV driving logic.

Algorithms 124 can then be uploaded on ADVs to be utilized during autonomous driving in real-time. In an embodiment, ADVs 101 can upload driving statistic data to server(s) 103 to facilitate crowd-sourced learning of algorithms and models 124 that can be downloaded to an ADV. For example, machine learning 122 can determine speed vs. steering input relationships that affect passenger comfort, wherein the speed and steering input are both within acceptable limits, but passenger comfort detected by IMUs or roll-pitch indicate levels that affect passenger comfort.

Figure 3:
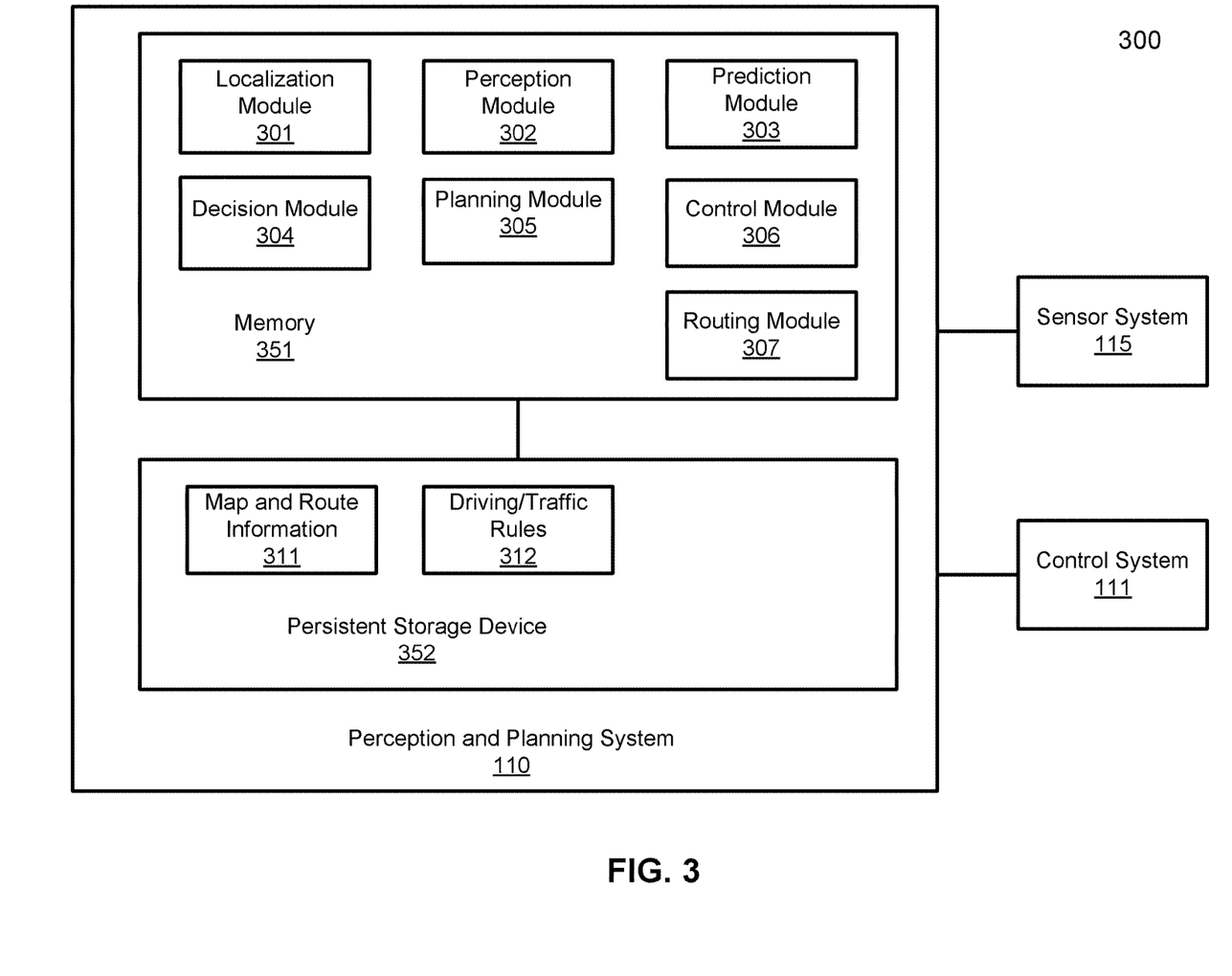
FIG. 3 is a block diagram illustrating an example of a perception and planning system used with an ADV according to one embodiment

FIG. 3 is block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR. A LIDAR device can comprises a laser emitter, a rotatable polygonal mirror to scan emitted laser beams in a first plane, a rotatable prism that can scan emitted beams received from the polygonal mirror in a second plane that is perpendicular to the first plane, and an optical sensor to read scanned laser beams in the first and second plane that are reflected off of a target object. The LIDAR device can scan a plurality of objects.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point.

For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4A:
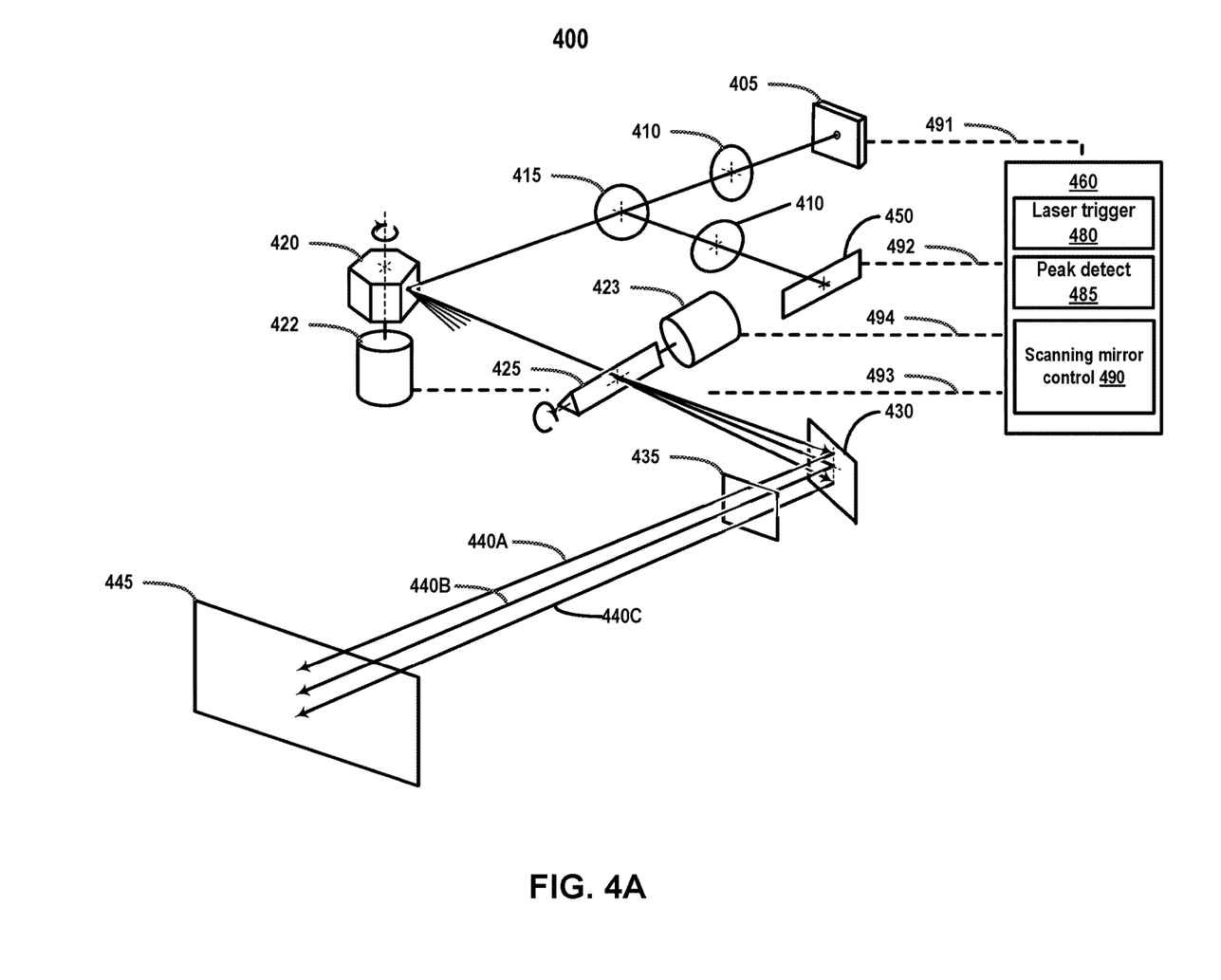
FIGS. 4A and 4B are block diagrams illustrating a LIDAR sensor system having a polygonal-shape mirror and a prism for scanning a target object near an ADV, for use with a LIDAR system in an ADV, according to one embodiment.
Figure 4B:
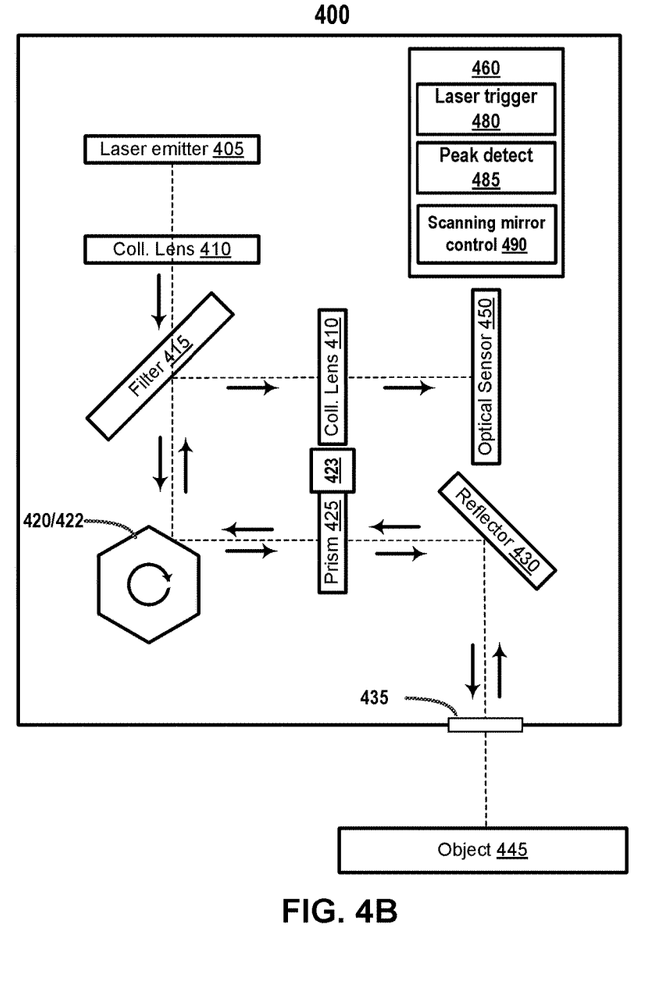

FIGS. 4A and 4B are block diagrams illustrating a LIDAR sensor system 400 having a polygonal-shaped mirror and a prism for scanning a target object 445 near an autonomous driving vehicle (ADV), for use with a LIDAR system in an ADV, according to one embodiment. FIG. 4A illustrates and example optical path for a laser beam and a reflected laser beam in a LIDAR sensor system 400. FIG. 4B illustrates a top view of a layout of optical components corresponding to FIG. 4A.

Referring now to FIG. 4A, LIDAR sensor system 400 in an ADV can include a laser emitter 405, a polygonal mirror 420 that is rotatable via a control motor 422 and scanning mirror control system 490, a prism 425 that is rotatable via a control motor 423 and scanning mirror control module 490, an optical sensor 450, and a controller 460 that includes a laser trigger module 480, a peak detection module 485, and a scanning mirror control module 490.

Laser emitter 405 emit a laser beam 440 in response to a signal from laser trigger module 480 via communication line 491. Laser emitter 405 can have a wavelength of 905 nm or 1550 nm laser pulse. Laser emitter 405 can have a wavelength between 905 nm and 1550 nm. Laser emitter 405 can have a pulse rate of 220 KHz, 1 MHz, or 3 MHz, or other pulse rate. In an embodiment, laser emitter 405 can be a diode-based laser emitter or a flashlamp-pumped laser. Emitted laser beam 440 can pass through a collimating optic 410 and a filter optic 415 to polygonal mirror 420. Filter optic 415 can be a 50% transmissive-50% reflective optic such that 50% of the emitted laser beam 440 passes through filter optic 415 to polygonal mirror 420.

Polygonal mirror 420 can be a multi-faceted polygon shape, such as hexagonal or octagonal, decagonal, etc., with each face having a reflective surface. A control motor 422 can rotate, or incrementally micro-step, polygonal mirror 420 in response to scanning mirror control 490 signals on communication line 493. In an embodiment, polygonal mirror 420 can be controlled increment control motor 422, for each laser beam 440, to position the polygonal mirror to reflect each of a first plurality laser beams 440 emitted by laser emitter 405, in a first plane. In an embodiment, the first plane can represent, e.g., a sequence of horizontally scanned laser beams 440.

Prism 425 can receive each of the first plurality of laser beams 440 from scanning mirror 440. In an embodiment, prism 425 can be held stationary while the first plurality of laser beams 440 are scanned in the first plane by incrementally positioning the polygonal mirror 420. Then, prism 425 can be positioned to a next position, and scanning mirror 420 can be set to a next position, and a second plurality of laser beams 440 can be emitted from laser emitter 405. Polygonal mirror 420 can be positioned to a next position for each laser beam 440 of the second plurality of laser beams 440. In an embodiment, the scanning process can be performed such that the prism 425 position is to a next position for each of a second plurality of laser beams 440 while the polygonal mirror 420 is held in a fixed position for the first plurality of laser beams 440.

Optical sensor 450 can comprise an avalanche photodiode (APD), an array of APDs, a camera, or other photo-sensing component.

Each laser beam 440 emitted by laser emitter 405 and reflected by polygonal mirror 420 can be passed through prism 425 to reflector 430, then out of the LIDAR sensor system 400 through aperture 435 to a target object 445 to be scanned. Each emitted laser beam 440 can be reflected off of target object 445 and reflected back to reflector 430, prism 425, polygonal mirror 420, then to filter optic 415. Filter optic 415 can direct the reflected laser beam to optical sensor 450. In an embodiment, filter optic 415 directs the reflected laser beam to optical sensor 450 via collimating optic 410. Peak detection module 485 can receive an output signal from optical sensor 450 via communication line 492. Peak detection module 485 can detect a peak magnitude of the reflected laser beam off of the target object 445 and a time, $t_{peak}$, at which the peak magnitude occurred. Using the time of emitting the laser beam, $t_{emit}$, to the time, $t_{peak}$, at which the peak magnitude of the reflected laser beam was detected by optical sensor 450, peak detection module 485 can determine a time of flight of the laser beam 440 to the target object 445, and back to the optical sensor 450, and thereby determine a distance that the target object 445 is away from the LIDAR sensor system 400.

In FIG. 4A, laser beams 440A, 440B, and 440C, represent a first plurality emitted laser beams 440 in an embodiment wherein prism 425 is incrementally positioned for each laser beam 440 emitted in a first plurality of laser beams, while polygonal mirror 420 is held in a fixed position. Then polygonal mirror 420 can be positioned to a next scan position, prism 425 can be repositioned to a starting scan position, and a laser emitter 405 can emit a second plurality of laser beams 440 while prism 425 is incrementally positioned for each laser beam 440.

FIG. 4B illustrates an top view of an example optical layout of the LIDAR sensor system 400 of FIG. 4A. A laser emitter 405 can emit a laser beam 440, in response to a signal from laser trigger 480. The emitted laser beam 440 passes through a collimating lens 410 to a filter 415. Filter 415 can be a 50% transmissive-50% reflective optic such that 50% of the collimated laser beam 440 is passed to polygonal mirror 420. Polygonal mirror 420 can reflect laser beam 440 to prism 425 which passes the laser beam 440 to a reflector 430. Reflector 430 can reflect the laser beam 440 out through aperture 435 to a target object 445. Target object 445 reflects the laser beam 440 back through aperture 435 to reflector 430. Reflector 430 passes the reflected laser beam to prism 425, and prism 425 passes the reflected laser beam to polygonal mirror 420. Polygonal mirror 420 and prism 425 are not repositioned from the time, $t_{emit}$, that the laser emitter 405 emits the laser beam 440 and the time, $t_{peak}$, at which a peak intensity of the reflected laser beam 440, reflected off of target object 445, is received at optical sensor 450. Polygonal mirror 420 directs the reflected laser beam 440 to filter optic 415, which directs the reflected laser beam 440 to optical sensor 450, via collimating optic 410. Peak detection module 485 can detect the peak magnitude of the intensity of the reflected laser beam 440 and a time, $t_{peak}$, at which the peak magnitude occurred. LIDAR information can included the peak magnitude, time-of-flight of the emitted laser pulse 440, $t_{emit}$, to the time, $t_{peak}$, of the peak magnitude of the intensity of the reflected laser beam at the optical sensor 450. Controller 460 can transmit the LIDAR information to perception and planning system 110 to determine one or more objects surrounding the ADV. Perception and planning system 110 can navigate the ADV along a route path taking into account the objects detected by the perception and planning system 110, based on the LIDAR information. One of the polygonal mirror 420 or the prism 425 can be positioned to a next position and another laser beam 440 can be emitted from laser emitter 405, and the reflection of the emitted laser beam 440 processed, as described above, to generate additional LIDAR information.

Figure 5A:
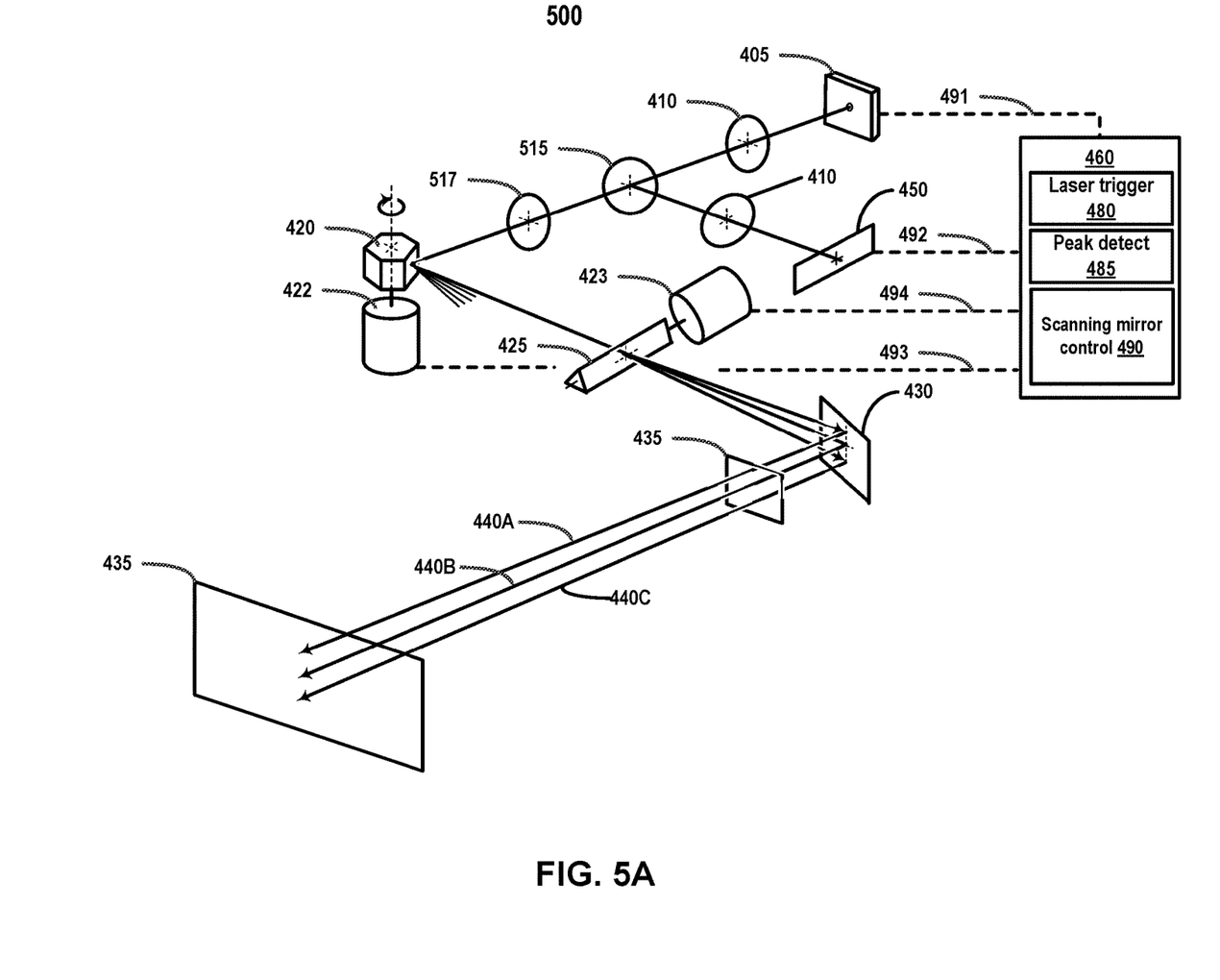
FIGS. 5A and 5B are block diagrams illustrating a LIDAR sensor system having a polygonal-shape mirror and a prism for scanning a target object near an ADV, for use with a LIDAR system in an ADV, according to one embodiment.
Figure 5B:
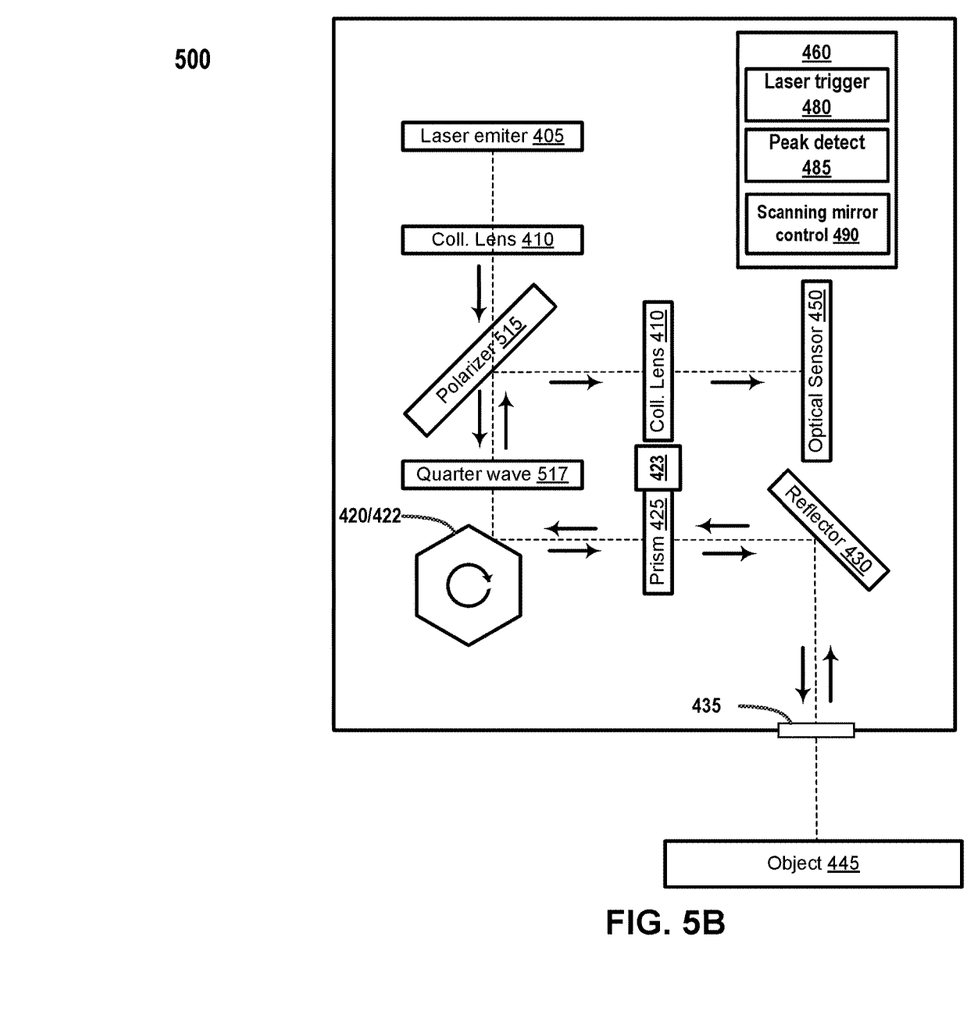

FIGS. 5A and 5B are block diagrams illustrating a LIDAR sensor system 500 having a polygonal-shape mirror 420 and a prism 425 for scanning a target object 445 near an autonomous driving vehicle, for use with a LIDAR system in an ADV, according to one embodiment.

FIG. 5A illustrates and example optical path for a laser beam and a reflected laser beam in a LIDAR sensor system 500. FIG. 5B illustrates a top view of a layout of optical components corresponding to FIG. 5A.

Referring now to FIG. 5A, a LIDAR sensor system 500 in an ADV includes a laser emitter 405, a polygonal mirror 420 that is rotatable via a control motor 422 and scanning mirror control system 490, a prism 425 that is rotatable via a control motor 423 and scanning mirror control module 490, an optical sensor 450, and a controller 460 that includes a laser trigger module 480, a peak detection module 485, and a scanning mirror control module 490.

Laser emitter 405 can emit a laser beam 440 in response to a signal from laser trigger module 480 via communication line 491. Laser emitter 405 can have a wavelength of 905 nm or 1550 nm laser pulse. Laser emitter 405 can have a wavelength between 905 nm and 1550 nm. Laser emitter 405 can have a pulse rate of 220 KHz, 1 MHz, or 3 MHz, or other pulse rate. In an embodiment, laser emitter 405 can be a diode-based laser emitter or a flashlamp-pumped laser. Emitted laser beam 440 can pass through a collimating optic 410 and a polarization optic 515 to a polarization rotation optic 517. Polarization rotation optic 517 can rotate the polarized laser beam 440 before sending the laser beam to polygonal mirror 420. In an embodiment, polarization rotation optic 517 can be a quarter wave (¼λ) plate which rotates polarization of the collimated polarized laser beam 440 by 90°.

Polygonal mirror 420 can be a multi-faceted polygon shape, such as hexagonal or octagonal, with each face having a reflective surface. A control motor 422 can rotate, or incrementally micro-step, polygonal mirror 420 in response to scanning mirror control 490 signals on communication line 493. In an embodiment, polygonal mirror 420 can be controlled by control motor 422 to position the polygonal mirror 420 to reflect each of a first plurality laser beams 440 emitted by laser emitter 405, in a first plane. In an embodiment, the first plane can represent, e.g., a sequence of horizontally scanned laser beams 440.

Prism 425 can receive each of the first plurality of laser beams 440 from scanning mirror 440. In an embodiment, prism 425 can be held stationary while the first plurality of laser beams 440 are scanned in the first plane. Then, prism 425 can be positioned to a next position, and scanning mirror 420 can be set to a next position, and a second plurality of laser beams 440 can be emitted from laser emitter 405. Polygonal mirror 420 can be positioned to a next position for each laser beam 440 of the second plurality of laser beams 440. In an embodiment, the scanning process can be performed such that the prism 425 is positioned to a next position for each of a second plurality of laser beams 440 while the polygonal mirror 420 is held in a fixed position for the first plurality of laser beams 440.

Each laser beam 440 emitted by laser emitter 405 can be passed through prism 425 to reflector 430, then out of the LIDAR sensor system 400 through aperture 435 to a target object 445 to be scanned. Each emitted beam 440 can be reflected off of target object 445 and reflected back to reflector 430, prism 425, polygonal mirror 420, then to polarization rotation optic 517. Polarization optic 517 can rotate the received laser beam, reflected off of target object 445, and rotate the received laser beam another 90°. Polarization optic 515 then reflects the received rotated, reflected, laser beam 440 and directs the laser beam to optical sensor 450. In an embodiment, polarization optic 515 directs the reflected laser beam to optical sensor 450 via collimating optic 410. Peak detection module 485 can receive an output signal from optical sensor 450 via communication line 492. Peak detection module can detect a peak magnitude of the reflected laser beam off of the target object 445 and a time, $t_{peak}$, at which the peak magnitude occurred. Using the time of emitting the laser beam 440, $t_{emit}$, and the time, $t_{peak}$, at which the peak magnitude of the reflected laser beam to optical sensor 450 was detected by peak detection module 485, peak detection module 485 can determine a time of flight of the laser beam 440 to the target object 445, and back to the optical sensor 450. From the time-of-flight, the peak detection module can determine a distance that the target object 445 is away from the LIDAR sensor system 500.

In FIG. 5A, laser beams 440A, 440B, and 440C, represent a first plurality of emitted laser beams 440 in an embodiment wherein prism 425 is positioned for each laser beam 440, while polygonal mirror 420 is held in a fixed position. Then polygonal mirror 420 can be positioned to a next scan position, prism 425 is repositioned to a starting scan position, and laser emitter 405 can emit a second plurality of laser beams 440 while prism 425 is, again, positioned for each laser beam 440.

FIG. 5B illustrates an top view of an example optical layout of the LIDAR sensor system 500 of FIG. 5A. A laser emitter 405 can emit a laser beam 440, in response to a signal from laser trigger module 480. The emitted laser beam 440 passes through a collimating lens 410 then a polarization optic 515 that polarizes the laser beam 440. Polarized laser beam 440 is then passed to a polarization rotation optic 517 that rotates the polarized laser beam by 90° before sending the rotated, polarized laser beam to polygonal mirror 420. Polygonal mirror 420 reflects laser beam 440 to prism 425 which passes the laser beam 440 to a reflector 430. Reflector 430 reflects the laser beam 440 out through aperture 435 to a target object 445. Target object 445 reflects the laser beam 440 back through aperture 435 to reflector 430. Reflector 430 passes the reflected laser beam 440 to prism 425, and prism 425 passes the reflected laser beam to polygonal mirror 420. Polygonal mirror 420 and prism 425 are not repositioned from the time, $t_{emit}$, that the laser emitter 405 emits the laser beam 440 and the time, $t_{peak}$, at which a peak intensity of the reflected laser beam 440, reflected off of target object 445, is received at optical sensor 450. Polygonal mirror 420 directs the reflected laser beam 440 to polarization rotation optic 517 which rotates the polarization of the reflected polarized laser beam 440 another 90°. Polarization optic 515 receives the rotated reflected laser beam 440 and reflects the laser beam 440 to optical detector 450, via collimating lens 410. Peak detection module 485 can detect the peak magnitude of the intensity of the reflected laser beam 440 and a time, $t_{peak}$, at which the peak magnitude occurred. LIDAR information, including the peak magnitude, time-of-flight of the emitted laser pulse 440 to the peak magnitude of the intensity of the reflected laser beam at the optical sensor 450, can be transmitted to perception and planning system 110 to determine one or more objects surrounding the ADV. Perception and planning system 110 can navigate the ADV along a path taking into account the objects detected by the perception and planning system, based on the LIDAR information. One of the polygonal mirror 420 or the prism 425 can be positioned to a next position and another laser beam 440 can be emitted from laser emitter 405, as described above.

Figure 6:
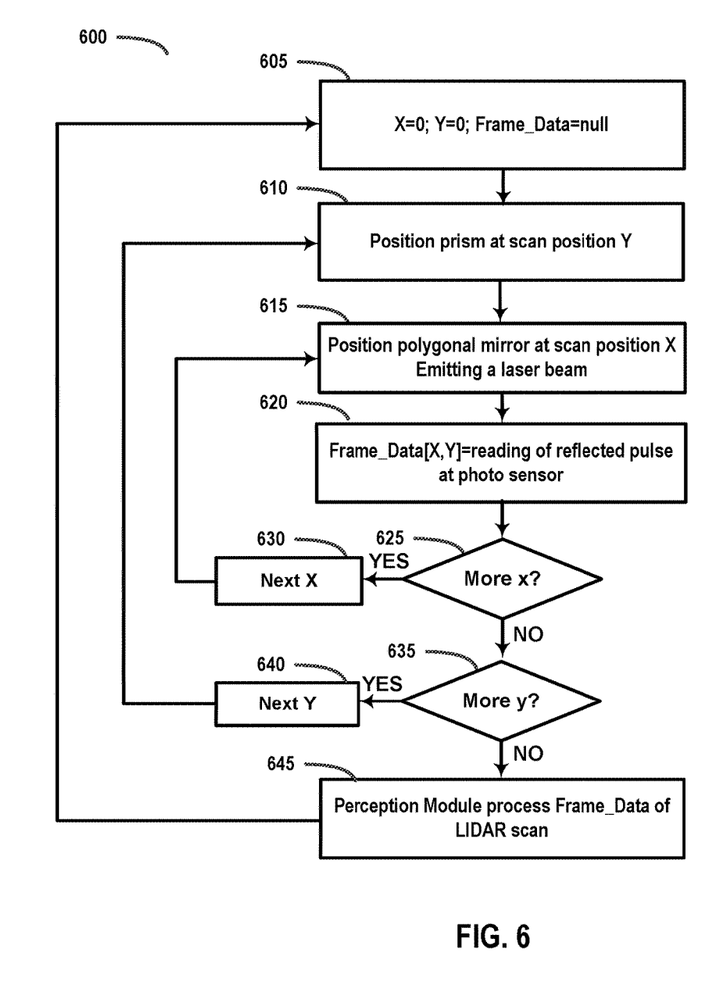
FIG. 6 illustrates a method of scanning a target object using a LIDAR sensor system having a polygonal-shape mirror and a prism for scanning a target object near an ADV, for use with a LIDAR system in the ADV, according to one embodiment.

FIG. 6 illustrates a method 600 of scanning a target object 445 using a LIDAR sensor system 400 or 500 having a polygonal mirror 420 and a prism 425 for scanning the target object 445 near an autonomous driving vehicle (ADV), for use with a LIDAR system in an ADV, according to one embodiment. A substantially rectangular area, e.g. m×n, of a target object is scanned using the two-dimensional (2D) scanning method 600. In method 600, polygonal mirror 420 can be positioned at a first position while prism 425 is also positioned at a first position. This first position is (x,y)=(0,0) of the area to be scanned of the target object. While prism 425 is held in a fixed position (y=0), polygonal mirror 420 can be incrementally repositioned for each of a first plurality of emitted laser beams, i.e. for x=1 . . . m scanning points, while y=0. Next, LIDAR information obtained for each emitted laser beam 440 in the first plurality of laser beams, while the prism 425 is held in a fixed position. Then, prism 425 can be incremented to a next position (y=1), polygonal mirror 420 can be set to a position corresponding to x=0, and a second plurality of laser beams can be emitted. For each of the second plurality of laser beams, a laser beam is emitted, LIDAR information is obtained from the reflection of the target object 445, and the polygonal mirror 420 can be incremented to a next position x∈{1 . . . m}. The process continues until prism 425 has been positioned to a maximum y-value, n, and LIDAR information has been obtained for all points (x,y)∈{x|x∈0 . . . m; y y∈0 . . . n}. Thus, in method 600, scanning of the target object 445 is by scanning a plurality of horizontal rows.

In operation 605, variables are initialized: x=0, y=0, and Frame_Data=null. Frame_Data is an array data structure to hold scan data for each scan row by emitting laser beams 440 while incrementing the position of polygonal mirror 420 and holding prism 425 in a fixed position, for a plurality of laser beams.

In operation 610, prism 425 is positioned at a fixed position for a first plurality of laser beams 440. In effect, for a first plurality of laser beams, prism is set to a constant value of y, while x varies from 0 . . . m by incrementing the position of the polygonal mirror 420 for each laser beam 440 in the first plurality of laser beams.

In operation 615, polygonal mirror 420 is positioned for emitting a first laser beam 440 in a first plurality of laser beams 440. Laser emitter 405 emits a laser beam 440. The emitted laser beam is transmitted to the polygonal mirror 420, through the prism 425, and reflected by reflector 430 to a target object 445. Target object 445 reflects the laser beam 440 back along the same path, but diverted to optical sensor 450, either by filtering optic 415 or by polarization optic 515.

In operation 620, optical sensor 450 receives the reflected laser beam from object 445. Peak detection module 485 reads optical sensor 450 to determine a peak magnitude of the intensity of the reflection of laser beam 440 off of target object 445. Peak magnitude module 485 also determines a time, $t_{peak}$, at which the peak magnitude occurred, related to the time, $t_{emit}$, at which the laser beam was emitted by laser emitter 405. The peak magnitude and time at which the peak magnitude occurred can be stored in array Frame_Data[x,y].

In operation 625, it can be determined whether there are more laser beams to emit in the first plurality of laser beams in the x-direction. If so, then method 600 continues at operation 630, otherwise method 600 continues at operation 635.

In operation 630, x can be incremented to a next position by incrementing a position of the polygonal mirror 420. Then method 600 continues at operation 615.

In operation 635, it can be determined whether there are more scan lines to scan in the y-direction. If so, then method 600 continues at operation 640, otherwise method 600 continues at operation 645.

In operation 640, y is incremented and the prism 425 is incremented to a next position. Polygonal mirror 420 is set to a position corresponding to x=0. Method 600 resumes at operation 610.

In operation 645, LIDAR information can be determined from the Frame_Data array, and the LIDAR information can be passed to the perception and planning system 110 of the ADV for processing. Method 600 resumes at operation 605.

Figure 7:
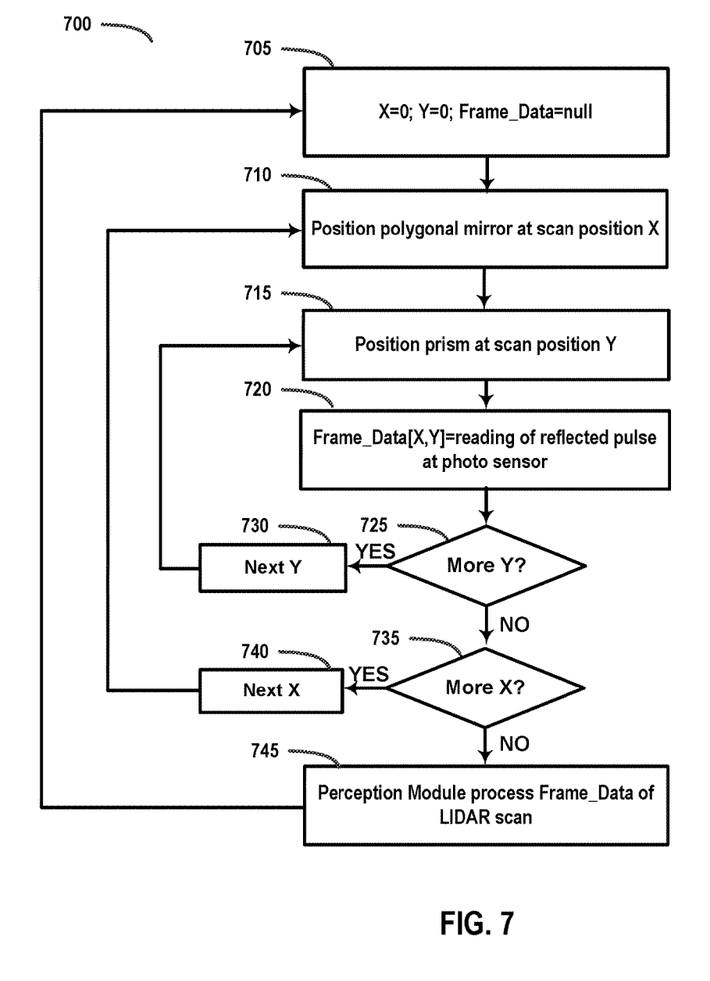
FIG. 7 illustrates a method of scanning a target object using a LIDAR sensor system having a polygonal-shape mirror and a prism for scanning a target object near an ADV, for use with a LIDAR system in an ADV, according to one embodiment.

FIG. 7 illustrates a method 700 of scanning a target object 445 using a LIDAR sensor system 400 or 500 having a polygonal mirror 420 and a prism 425 for scanning the target object 445 near an autonomous driving vehicle (ADV), for use with a LIDAR system in an ADV, according to one embodiment. A substantially rectangular area of a target object is scanning using the two-dimensional (2D) scanning method 700. In method 700, while polygonal mirror 420 is positioned at a first position (x=0), the prism 425 can be positioned at an first position (y=0). This first position is (x,y)=(0,0) of the area to be scanned of the target object. While polygonal mirror 420 is held in a fixed position (x=0), prism 425 can be incrementally repositioned for each of a first plurality of emitted laser beams, i.e. for y=1 . . . n scanning points, thereby generating a vertical scanning stripe of target object 445. LIDAR information is obtained for each emitted laser beam 440 in the first plurality of laser beams. Then, polygonal mirror 420 can be incremented to a next position (x=1), prism 425 can be set to a position corresponding to y=0, and a second plurality of laser beams can be emitted. For each of the second plurality of laser beams, a laser beam is emitted, LIDAR information is obtained from the reflection of the target object 445, and the prism 425 can be incremented to a next position y∈{1 . . . n}. The process continues until polygonal mirror 420 has been positioned to a maximum x-value, m, and LIDAR information has been obtained for all points (x,y)∈{x|x∈0 . . . m; y y∈0 . . . n}. Thus, method 700, scanning of the target object 445 is by scanning a plurality of vertical columns.

In operation 705, variables are initialized: x=0, y=0, and Frame_Data=null. Frame_Data is an array data structure to hold scan data for each scan column by emitting laser beams 440 while incrementing the position of prism 425 and holding polygonal mirror 420 in a fixed position, for a plurality of laser beams.

In operation 710, polygonal mirror 420 is positioned at a fixed position for a first plurality of laser beams 440. In effect, for a first plurality of laser beams, polygonal mirror 420 is set to a constant value of x, while y varies from 0 . . . n by incrementing the position of the prism 425 for each laser beam 440 in the first plurality of laser beams.

In operation 715, prism 425 is positioned for emitting a first laser beam 440 in a first plurality of laser beams 440. Laser emitter 405 emits a laser beam 440. The emitted laser beam is transmitted to the polygonal mirror 420, through the prism 425, and reflected by reflector 430 to a target object 445. Target object 445 reflects the laser beam 440 back along the same path, but diverted to optical sensor 450, either by filtering optic 415 or by polarization optic 515.

In operation 720, optical sensor 450 receives the reflected laser beam from object 445. Peak detection module 485 reads optical sensor 450 to determine a peak magnitude of the intensity of the reflection of laser beam 440 off of target object 445. Peak magnitude module 485 also determines a time, $t_{peak}$, at which the peak magnitude occurred, related to the time, $t_{emit}$, at which the laser beam was emitted by laser emitter 405. The peak magnitude and time at which the peak magnitude occurred can be stored in array Frame_Data[x,y].

In operation 725, it can be determined whether there are more laser beams to emit in the first plurality of laser beams in the y-direction. If so, then method 700 continues at operation 730, otherwise method 700 continues at operation 735.

In operation 730, y can be incremented to a next position by incrementing a position of the prism 425. Then method 700 continues at operation 715.

In operation 735, it can be determined whether there are more scan lines to scan in the x-direction. If so, then method 700 continues at operation 740, otherwise method 700 continues at operation 745.

In operation 740, x is incremented and the polygonal mirror 420 is incremented to a next position. Prism 425 is set to a position corresponding to y=0. Method 700 resumes at operation 710.

In operation 745, LIDAR information can be determined from the Frame_Data array, and the LIDAR information can be passed to the perception and planning system 110 of the ADV for processing. Method 700 resumes at operation 705.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A LIDAR device for autonomous driving vehicles, comprising:
    a laser emitter to emit an initial laser beam;
    a polygonal mirror positioned to receive the laser beam from the laser emitter, the polygonal mirror having a plurality of reflective surfaces, wherein the polygonal mirror is configured to rotate in a first rotational direction to deflect the initial laser beam into a first set of a plurality of laser beams in a first plurality of directions in a first plane using the reflective surfaces;
    a prism positioned to receive at least a portion of the first set of laser beams, wherein the prism is configured to divert the first set of laser beams into a second set of plurality of laser beams in a second plurality of directions in a second plane, so that the second set of laser beams scan a target object in a wider angle than an angle formed by the first plurality of directions; and
    an optical sensor configured to receive a third set of laser beams reflected from the target object, the third set of laser beams associated with the second set of laser beams, wherein the prism is not incrementally repositioned until the polygonal mirror completes generating the first set of laser beams and is incrementally repositioned thereafter.

2. The LIDAR device of claim 1, wherein the prism is configured to rotate according to a second rotational direction to divert the first set laser beams in the wider scanning angle.

3. The LIDAR device of claim 2, wherein the first rotational direction is different than the second rotational direction.

4. The LIDAR device of claim 1, wherein the first plane and second plane are substantially perpendicular.

5. The LIDAR device of claim 1, wherein the third set of beams represent a substantially rectangular scan area of the target object.

6. The LIDAR device of claim 1, further comprising one of:
    positioning the polygonal mirror once for all laser beams in the first set of laser beams and repositioning the prism for each laser beam in the first set of laser beams; or
    repositioning the polygonal mirror for each laser beam of the first set of laser beams and positioning the prism once for all beams in the first set of laser beams.

7. The LIDAR device of claim 1, further comprising one of:
    a filtering optic comprising a 50% transmissive-50% reflective optic; or
    a polarizing optic and a polarization rotation optic.

8. The LIDAR device of claim 1, wherein the laser emitter emits laser beams having at least one of:
    a wavelength of 905 nm or 1550 nm laser pulse; or
    a pulse rate of 220 KHz, 1 MHz, or 3 Mhz.

9. The LIDAR device of claim 1, further comprising a synchronization module configured to coordinate:
    emitting a laser pulse; and
    positioning the polygonal mirror and prism to scan the target object.

10. The LIDAR device of claim 9, wherein the coordination comprises one of:
    continuously emitting laser beams, without reading the optical sensor for those laser beams that occur during the repositioning of the polygonal mirror and/or prism; or
    stopping the emitting of laser beams during times that either, or both, of the polygonal mirror and/or the prism are being positioned.

11. A non-transitory machine-readable medium having instructions stored therein, which when executed by a processor, cause the processor to perform operations, the operations comprising:
    emitting, by a laser emitter, an initial laser beam;
    positioning a polygonal mirror to receive the laser beam from the laser emitter, the polygonal mirror having a plurality of reflective surfaces, wherein the polygonal mirror is configured to rotate in a first rotational direction to deflect the initial laser beam into a first set of plurality of laser beams in a first plurality of directions in a first plane using the reflective surfaces;
    positioning a prism to receive at least a portion of the first set of laser beams, wherein the prism is configured to divert the first set of laser beams into a second set of plurality of laser beams in a second plurality of directions in a second plane, so that the second set of laser beams scan a target object in a wider angle than an angle formed by the first plurality of directions, wherein the prism is not incrementally repositioned until the polygonal mirror completes generating the first set of laser beams and is incrementally repositioned thereafter; and
    an optical sensor configured to receive a third set of laser beams reflected from the target object, the third set of laser beams associated with the second set of laser beams.

12. The medium of claim 11, wherein the operations further comprise synchronizing operations, including:
    emitting a laser pulse; and
    positioning the polygonal mirror and prism to scan the target object.

13. The medium of claim 12, wherein the operations further comprise one of:
    positioning the polygonal mirror once for all laser beams in the first set of laser beams and repositioning the prism for each laser beam in the first set of laser beams; or
    repositioning the polygonal mirror for each laser beam of the first set of laser beams and positioning the prism once for all beams in the first set of laser beams.

14. The medium of claim 12, wherein the synchronizing operations comprise one of:
   continuously emitting laser beams, without reading the optical sensor for those laser beams that occur during the repositioning of the polygonal mirror and/or prism; or
   stopping the emitting of laser beams during times that either, or both, of the polygonal mirror and/or the prism are being positioned.

15. The medium of claim 12, wherein the third set of beams represent a substantially rectangular scan are of the target object.

16. A computer-implemented method, comprising:
   emitting, by a laser emitter, an initial laser beam;
   positioning a polygonal mirror to receive the laser beam from the laser emitter, the polygonal mirror having a plurality of reflective surfaces, wherein the polygonal mirror is configured to rotate in a first rotational direction to deflect the initial laser beam into a first set of plurality of laser beams in a first plurality of directions in a first plane using the reflective surfaces;
   positioning a prism to receive at least a portion of the first set of laser beams, wherein the prism is configured to divert the first set of laser beams into a second set of plurality of laser beams in a second plurality of directions in a second plane, so that the second set of laser beams scan a target object in a wider angle than an angle formed by the first plurality of directions, wherein the prism is not incrementally repositioned until the polygonal mirror completes generating the first set of laser beams and is incrementally repositioned thereafter; and
   receiving, by an optical sensor, a third set of laser beams reflected from the target object, the third set of laser beams associated with the second set of laser beams.

17. The method of claim 16, further comprising performing synchronizing operations, including:
   emitting a laser pulse; and
   positioning the polygonal mirror and prism to scan the target object.

18. The method of claim 16, further comprising one of:
   positioning the polygonal mirror once for all laser beams in the first set of laser beams and repositioning the prism for each laser beam in the first set of laser beams; or
   repositioning the polygonal mirror for each laser beam of the first set of laser beams and positioning the prism once for all beams in the first set of laser beams.

19. The method of claim 17, wherein the synchronizing operations comprise at least one of:
   continuously emitting laser beams, without reading the optical sensor for those laser beams that occur during the repositioning of the polygonal mirror and/or prism; or
   stopping the emitting of laser beams during times that either, or both, of the polygonal mirror and/or the prism are being positioned.

20. The method of claim 16, wherein the third set of beams represent a substantially rectangular scan are of the target object.

* * * * *